3,488,569
MULTIVOLTAGE ALTERNATING CURRENT ELECTRIC MOTOR STATOR
Lewis R. Allendorph and Earl D. Stauffer, Fort Wayne, Ind., assignors to General Electric Company, a corporation of New York
Filed Apr. 4, 1967, Ser. No. 628,366
Int. Cl. H02p 1/26, 1/46
U.S. Cl. 318—225                      7 Claims

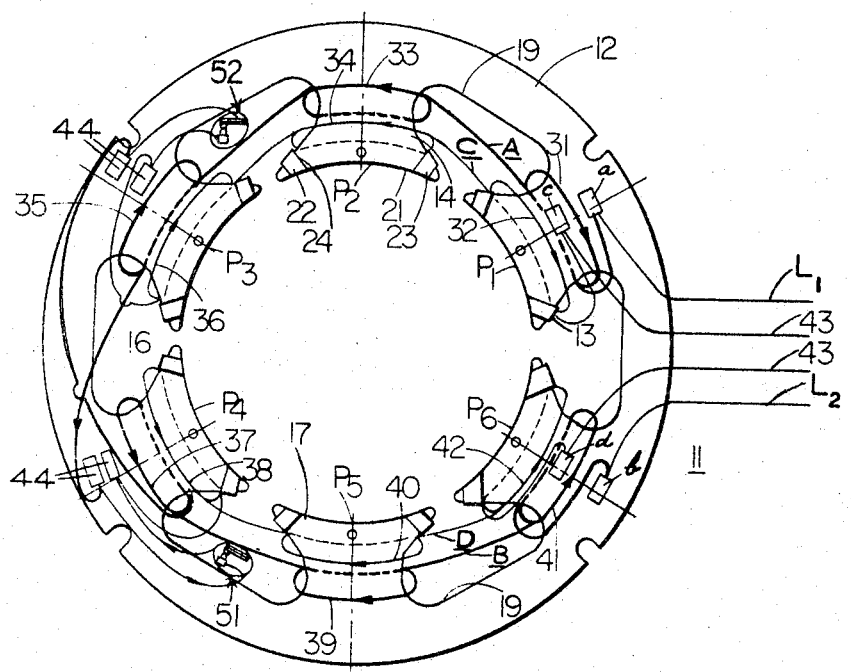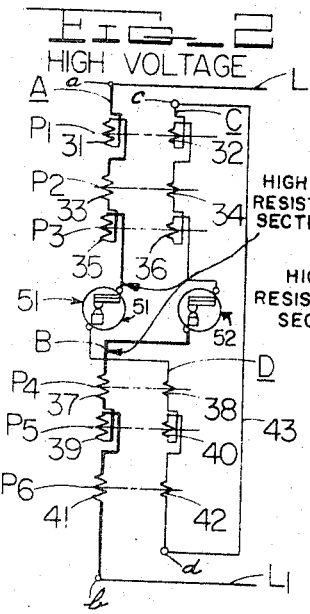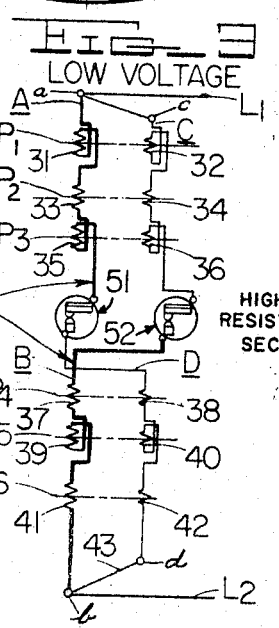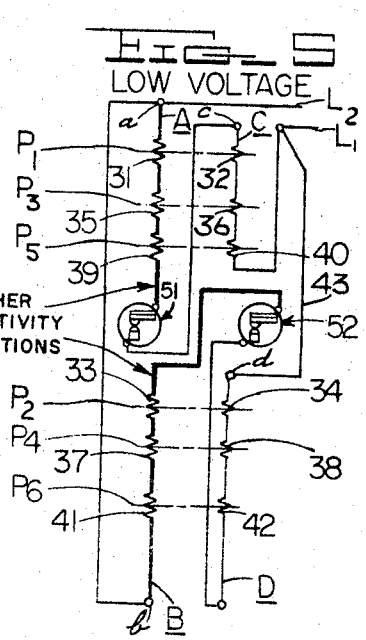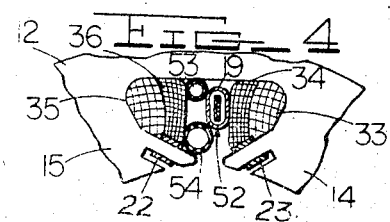
INVENTORS
LEWIS R. ALLENDORPH
EARL D. STAUFFER
BY John B. Stoudt
ATTORNEY United States Patent Office 3,488,569
Patented Jan. 6, 1970

ABSTRACT OF THE DISCLOSURE

A multivoltage alternating current electric motor selectively operative at high and lower voltage levels especially to drive fans, blowers, and the like. First and second winding sections are formed of turns wound from electrically conductive material having a preselected resistivity. For the high voltage level, the first and second winding sections are connected in series circuit, with third and fourth winding sections having turns wound from electrically conductive material differing in resistivity from that of the first and second sections. At the lower voltage level, the first and third winding sections are connected in parallel circuit with the second and fourth sections. Motor operation is approximately equivalent for both voltage levels, while at the same time, savings are realized from the arrangement. In addition, independent thermal protection may conveniently be provided for the winding sections.

Background of the invention

This invention relates to multivoltage alternating current electric motors, and more particularly to an improved yet relatively low cost stator for use in single-phase, dual-voltage induction type electric motor adapted for selective operation at different voltage levels.

For a number of applications such as driving fans in air conditioners and the like, it is quite desirable to furnish multivoltage single-phase AC electric motors capable of selective operation on at least two different voltage input levels, for instance 230 and 115 volts at a frequency of either 50 or 60 cycles per second. Such multivoltage motors are generally provided with at least two main or primary windings which are connected for concurrent excitation in series relation during the application of the high voltage level and in parallel relation for the lower voltage level. The disclosures in the R. E. Seely Patent 2,630,553 and in the L. Mollenberg Patent 2,860,296 as well as in the presently pending I. E. Ross patent application S.N. 335,042 are representative of this approach.

In an attempt to achieve economy where the application permits, the multivoltage motor usually employs the less expensive salient pole type shaded pole stator even though this motor type is generally characterized by relatively low output when compared with a motor having the kind of stator illustrated in the Mollenberg patent. Consequently, multivoltage motors incorporating a salient pole type stator conventionally utilize windings wound of electrically conductive material having a high electrical conductivity property or conversely, low resistivity like copper, with the resistivity normally being in the neighborhood of 1.724 microhms per cubic centimeter at twenty degrees centigrade.

In order to obtain further economies, if possible, it would be extremely desirable to employ electrically conductive material having a unit price less than that for copper, such as aluminum, for at least part of the windings in multivoltage electric motors without unduly affecting the performance of the motor for a given over-all motor size. However, there are a number of obstacles and difficulties in attaining such economies without at the same time either requiring an increase in motor size or a decrease in performance of such magnitude that the motor becomes unsuitable for the particular application. This is especially the situation for multivoltage motors having stators with six or more salient poles where the space for accommodating coil sides between adjacent salient poles is quite limited. For instance, taking aluminum by way of exemplification, a typical resistivity for aluminum is 2.828 as compared with 1.724 for copper and thus it has less ability to conduct elecrticity for the same volume of material. This in turn would necessitate the use of more aluminum than copper to approximate the same performance for the motor when the windings are composed entirely of copper. In addition, for the lower voltage operating level where a number of coils are normally connected in parallel circuit paths, the employment of two materials having dissimilar resistivities would tend to create currents out of phase in the operating poles of the motor as well as a lack of equivalence between the parallel paths, such as excessive current densities and heating problems in one of the paths when overloaded.

It is thus highly desirable that these problems be overcome and satisfactory performance be produced by an economical arrangement which is not overly complex in construction, yet permits use of material having dissimilar resistivities in the winding circuits.

Consequently, it is the primary object of the present invention to provide an improved stator adapted for use in a single phase multivoltage induction electric motor selectively operative at several different rated voltage levels.

It is another object of the invention to provide an improved yet economical stator member for use in a single phase multivoltage induction electric motor which overcomes the problems and furnishes the desirable features mentioned above.

It is yet another object of the present invention to provide an improved stator member for use in a single phase multivoltage induction type electric motor selectively operative at high and lower voltage levels, which is capable of incorporating a number of coils fabricated from materials having dissimilar resistivities, without necessitating an increase in over-all motor size to retain a given rating as compared with motors having coils formed of the same material, and at the same time produces satisfactory performance even at the lower voltage level where certain coils may be connected in parallel circuit paths.

Summary of the invention

In carrying out the invention in one form, we provide an improved stator member adapted for use in a single phase, multivoltage induction electric motor selectively operative at either a high or lower voltage level. The stator has a magnetic core which accommodates first and second winding sections formed of turns wound from electrically conductive material having a preselected resistivity, for instance aluminum. Third and fourth winding sections are also carried by the core and are formed of turns wound from other electrically conductive material having a resistivity differing from the preselected resistivity, for example copper material.

In order to operate the motor at the high voltage level, all of the winding sections are selectively connectable in series circuit relation with one another to form a plurality of primary running poles. For operation of the motor at the lower voltage level, the first and third winding connections are connectable in parallel circuit relation with the second and fourth winding connections to form the plurality of primary running poles. A given running pole for the high and lower voltage levels of operation will thus include turns wound from both types of conductive material. With this arrangement, motor operation is approximately equivalent at both voltage levels in spite of the use of relatively inexpensive material for some of the sections and the ecomomies attained.

Further, the arrangement permits the employment of existing winding equipment and the rapid installation of responsive circuit-interrupting means connected serially between the first and third winding sections as well as between the second and fourth winding sections. Consequently, at the high voltage level, either means will be operative to interrupt the flow of alternating current to the four winding sections. However, at the lower voltage level, both of the thermally responsive circuit-interrupting means must be actuated to effect termination of the motor operation.

The subject matter which we regard as our invention is particularly pointed out and distinctly claimed in the concluding portion of the specification. Our invention, itself, however, both as to its organization and method of operation, together with further objects and advantages thereof may be best understood by reference to the following description taken in connection with the accompanying drawing.

Brief description of the drawing

In the drawing:

FIGURE 1 is an end elevational view, partially in schematic form, of a stator member embodying one form of the present invention and adapted for use in a single phase alternating current multivoltage induction electric motor which is selectively connectable for operation at high and lower rated voltage levels;

FIGURE 2 is a schematic winding circuit diagram showing the primary running poles formed for the stator of FIGURE 1 under the high voltage connection for the motor;

FIGURE 3 is a schematic winding circuit diagram revealing primary running poles formed by the winding sections of the stator of FIGURE 1 during the lower voltage operation;

FIGURE 4 is an enlarged partial view of one of the slots and associated core and coil structure of the stator shown in FIGURE 1 to illustrate further details; and FIGURE 5 is a schematic winding circuit diagram for the stator of FIGURE 1 revealing a modified arrangement of the present invention as employed for the lower voltage operation.

Description of the preferred embodiment

Turning now to the drawing in more detail, one preferred form of the present invention is illustrated in connection with a stator member adapted for use in a single phase alternating current multivoltage induction electric motor, capable of selective operation under two different rated voltage levels, such as a high voltage level of 230 volts and a lower level of 115 volts. More specifically, the stator member, identified generally by the reference numeral 11 in FIGURE 1, has a laminated magnetic core fabricated from a predetermined plurality of laminations which are held together in stacked, face to face, relation by any suitable means (not shown). By way of illustration, the core may be similar to that disclosed more fully in the M. V. De Jean Patent 3,030,528, granted Apr. 17, 1962, and assigned to the same assignee as the present invention. The core in the present exemplification is of the salient pole type having a generally annular yoke section 12 and six integral salient pole sections 13-18 inclusive which project radially inward from the yoke section to form a number of coil accommodating slots 19 between adjacent pole sections in the usual way.

The six salient pole sections or generally radial polar projections are equally and angularly spaced apart such that tips 21 together define a rotor receiving bore, with each pole section being provided with a pair of slots 22, 23 extending inwardly from the pole face and spaced slightly from each edge of the pole face. A conventional shading coil or ring 24 is furnished with a side in its accommodating slot, surrounding the associated edge of the pole face to create a lagging magnetic field, depending upon the direction of rotation of the rotor (not shown) primarily for starting purposes. Standard flat copper bar stock may be employed to fabricate these shading coils 24.

In the present exemplification, slots 19 carry four winding sections, two winding sections A and B being formed of turns wound from relatively inexpensive electrically conductive material of a relatively high resistivity, preferably enameled aluminum wire. The two other winding sections C and D are formed of turns wound from electrically conductive material having a lower resistivity or a high electrical conductivity such as enameled copper wire. The winding sections are arranged on the core to provide a plurality of coil groups which in turn form or produce primary running poles $P_1$–$P_6$ inclusive during operation, each coil group including a preselected number of turns from both winding sections A and C or from B and D as seen from FIGURES 1, 2, and 3. Since the illustrated multivoltage motor incorporates a shaded pole type stator having six salient poles, winding sections A, C together form three polar coil groups having pairs of coils 31, 32; 33, 34; and 35, 36; respectively carried concentrically around adjacent salient sections 13, 14 and 15 to produce poles $P_1$, $P_2$ and $P_3$. The turns of the other two winding sections B and D also define three coil groups and poles $P_4$, $P_5$, $P_6$ by concentric pairs of coils 37, 38; 39, 40; and 41, 42 respectively encircling the necks of salient pole sections 16, 17, and 18. The coils of all winding sections may be conveniently installed on the core in any suitable way, for instance, by such highly desirable winding equipment as disclosed in the L. M. Mason Patent 2,934,280 such that adjacent poles are of opposite instantaneous polarity, as indicated by the assumed current flows through the coils shown by the arrows in FIGURE 1.

Considering now FIGURE 2 and the manner in which the winding sections are connected in circuit with one another for high voltage operation, in the exemplification winding section A is in series circuit with winding section D, formed of the lower resistivity material than that for A, while winding section B is in series circuit relation with section C which is formed of lower resistivity material than the material for the associated section B. The two separate sets of winding sections A, D and B, C are attached by conductor 43 and standard connectors c, d, in series circuit paths relative to one another, all sections thus being connected in series between standard connectors a, c, across power input lines $L_1$, $L_2$ which are in turn connectable to a suitable A.C. power source at high voltage; e.g. 230 volts (not shown). With this arrangement, each coil group and hence the primary running poles have turns of different resistivities from each of the two sets of winding sections.

For operation at a lower voltage level, for instance, 115 volts, as seen in FIGURE 3, each set of winding sections A, D, and B, C, still has its associated sections in series relation with the running poles still including turns of different resistivities from each of the two sets. However, the sets of winding sections A, D, and B, C are placed in parallel circuit paths between connectors a, b at lines $L_1$, $L_2$ by conductors 43 attached to the respective ends of sections C and D. It has been found in actual practice that the above circuit relationships, in spite of employment of high resistivity material for selected winding sections, and the cost advantages obtained, enhanced performance is produced without need to either increase the size of the motor for a given rating or to reduce the rating for a given overall motor size. For both voltage levels of operation, the currents are in phase in the same pole and the performance is approximately equivalent. In addition, no current density and heating problems are created at either voltage level.

The following example is given to show even more clearly how the invention, as described above, has been carried out in actual practice and to reveal the benefits which may result from its use. A number of stator members having the core configurations and coil deployments illustrated in FIGURE 1 were incorporated in six pole, single phase multivoltage induction motors, rated at 25 milihorsepower and adapted for selective operation under sixty cylces per second respectively under 230 and 115 voltage levels. The rotors were of standard construction, each having a magnetic core accommodating a squirrel cage cast aluminum winding with 45 bars short-circuited at each end by end rings. The stator cores of the exemplification had the following nominal dimensions:

|   | Inches |
|---|---|
| Bore diameter | 2.65 |
| Outer peripheral diameter | 4.79 |
| Stack length | 1.08 |

Winding sections A and B included 200 turns per coil of 0.0201 inch diameter enameled aluminum wire, with sections C and D having 156 turns per coil of 0.0142 inch diameter enameled copper wire. The winding sections in one representative motor had the following resistances measured at twenty-six degrees centigrade: A=10.39 ohms; B=10.38 ohms; C=12.73 ohms; and D=12.66 ohms. During operation at the high voltage level of 230 volts at 60 cycles per second (FIGURE 2), the current density for winding sections A and B in the representative motor was 2600 amps per square inch and 5150 amps per square inch for sections C and D. No heating problems were created. Further results are tabulated below:

| Connection | Current (amperes) | Watts, input | Speed (r.p.m.) | Torque output (oz., ft.) | Efficiency |
|---|---|---|---|---|---|
| Figure 3: | | | | | |
| Sections A, D | .82 | 60 | 1,000 | 4.44 | 33 |
| Sections B, C | .82 | 60 | | | |
| Figure 2 | .82 | 120 | 1,000 | 4.42 | 33 |

From the above table it will be seen that the performance for both voltage levels was approximately equivalent and that the currents were in phase in each pole, among other beneficial features. To derive the most beneficial use of the invention, taking into consideration both performance and economy, it is believed that the total turns for winding sections A and B should exceed those for C and D.

The significance of the above performance may be better appreciated from a comparison with the performance of the same motor components having the same coils connected other than in accordance with the present invention. By way of illustration, for low voltage operation, winding sections A, B were placed in series and connected to form a parallel circuit with serially connected sections C, D between points "a" and "b." Current and watts input of sections A, B were 0.685 ampere and 6 watts respectively as compared with 1.09 amperes and 116.5 watts for the parallel path of sections C, D. The relative current density in sections A, B as compared with C, D was 2,200 amperes per square inch versus 6,900, with a power factor of almost 90° lag for sections A, B. Moreover, the torque dropped to 4.22 ounce-feet and the efficiency was 29% as contrasted to 33%.

It should be noted at this time that by forming each winding section from continuous strands of enameled wire, it is convenient, both from the standpoint of ease in installation and cost, to connect by conventional connectors 44 one thermal protector 51 in series between winding terminations of sections A and D in one circuit path and a second thermal winding protector 52 between sections B and C in the other path. These protectors may be any suitable heat sensing circuit interrupting switch devices, such as that disclosed in the C. A. Dubberley Patent 2,909,719 or commercially available types; e.g., catalogue No. DA8M sold by Franklin Dales Co. of Akron, Ohio. Each device may be disposed in primary heat transfer relation with a set of winding sections in the manner illustrated in FIGURES 1 and 4. For example, taking device 52, its outer heat sensitive casing may be held in primary heat transfer contact with the outer surface of coil 34 of winding section C by tubular insulators 53, 54 (FIGURE 4). The term "primary heat transfer relation" is explained more fully in the copending Ross application. The other device 51 in the illustrated embodiment may be disposed between coils 38 and 40 of section D and thus responsive to the temperature change of that winding section.

During the high voltage operation when all winding sections are in a single series circuit path between lines $L_1$, $L_2$ each thermal protector will be independently operative to an open position should the temperature in its vicinity ever rise to an unusually high level, or predetermined heated condition, such as 130° C. Thus, the circuit between lines $L_1$, $L_2$ would be interrupted and the winding sections deenergized when the heated condition is reached to interrupt immediate operation of the motor. Once the heated condition becomes corrected and the temperature near the device develops to a safe value, the switch closes to complete the circuit through it.

When the motor is connected for the low voltage condition as seen in FIGURE 3, should the heated condition occur in the vicinity of one of the devices, such as device 51, it would be effective to open only the parallel circuit path through the associated sections, A, D in the case of device 51. The other parallel circuit path, however, through device 52 and associated sections B, C would still be closed across lines $L_1$, $L_2$ until the predetermined heated condition would be reached in the vicinity of device 52. Thus, the motor is permitted to operate, at least temporarily, on the lower voltage level until either the heated condition becomes abated or due at least in part to an increased current in the other parallel path and a corresponding rise in temperature near the second device, the parallel path becomes interrupted thereby disconnecting the motor from lines $L_1$, $L_2$. Consequently, a maximum prudent degree of uninterrupted service for the motor is attained while at the same time adequate thermal protection is afforded when, if ever, a potentially dangerous heated condition occurs within the confines of the motor housing. Moreover, this protection is furnished without the necessity for breaking any continuous and existing interpole wire connecting coils of adjacent coil groups for a given winding section.

It will be recognized by those skilled in the art from the foregoing that the present invention is not limited to the illustrated embodiment of FIGURES 1 through 4 inclusive but, rather, may be incorporated in single phase, multivoltage motors having at least two primary running poles as well as distributed wound coil groups carried by the types of core shown in the L. Mollenberg Patent 2,860,296 previously mentioned. Further, the invention may be utilized in multivoltage motors having circuit connections other than that illustrated in FIGURES 2 and 3 and still obtain certain benefits thereof.

In this regard, FIGURE 5 illustrates a modification of the present invention in which like parts are identified by like character references employed in connection with the previously described embodiment of FIGURES 1 through 4 inclusive. For each disclosure, it will be assumed that the motor also has six primary running poles. In the embodiment of FIGURE 5, like the first embodiment, each coil group and primary running pole includes turns of different electrically conductive material. However, in contrast to the first embodiment, the coils of winding sections A and C are always connected in series relation through thermal protector 51 and form every other pole with the same instantaneous polarity. The second set of associated sections B and D are likewise in the same series circuit through device 52 and provide every other pole with the same polarity, opposite to that formed by associated sections A, C.

For the low voltage operation illustrated in FIGURE 5, serially connected winding sections A, C are in parallel between points $a$ and $c$ with serially connected sections B, D through two conductors 43. The arrangement of FIGURE 5 has the advantage of permitting the installation of all of the coils of a given wire section on the core in the same direction and allows, at least in theory, consequent pole motor operation temporarily should one set of winding sections be deenergized by the opening of either thermal protector in the rare case of a potentially dangerous heated condition in the vicinity of either device. For high voltage operation, all winding sections may be placed in a single series circuit path between connectors $a$ and $c$ by attaching coil 40 of section C to coil 41 of section B rather than respectively to lines $L_2$, $L_1$ as shown.

It should be apparent to those skilled in the art that while we have shown and described what at present are considered to be the preferred embodiments of our invention in accordance with the patent statutes, it is to be understood that modifications can be made without actually departing from the true spirit and scope of this invention, and we therefore intend to cover in the following claims all such equivalent variations as fall within the invention.

What we claim as new and desire to secure by Letters Patent of the United States is:

1. In a single phase alternating current multivoltage induction motor selectively operative at high and lower voltage levels, a stator comprising a core having coil accommodating means carrying a plurality of coil groups in the same phase forming at least two running poles; said coil groups including at least one coil wound from a first electrically conductive material having a preselected resistivity, and at least another coil wound from a second electrically conductive material having a resistivity different from that of said first electrically conductive material; the coil pluralities being selectively connectable in series circuit relation with one another for motor operation at the high voltage level; and first and second preselected numbers of the at least one coil and of the at least another coil respectively connected in series relation, with the first and second preselected numbers being disposed in parallel circuit paths for selective energization at the lower voltage level; whereby motor performance at the high and lower voltage levels is approximately the same.

2. The stator of claim 1 wherein for the lower voltage level of motor operation, at least one coil wound from the first electrically conductive material, and the at least another coil wound from the second electrically conductive material in the same coil group are disposed in different parallel circuit paths.

3. The stator of claim 1 wherein for the lower voltage level of motor operation, the at least one coil wound from the first electrically conductive material, and the at least another coil wound from the second electrically conductive material in the same coil group are connected in series relation with a different thermally responsive circuit-interrupting means to afford independent thermal protection for the at least one coil and the at least another coil.

4. In a single phase alternating current multivoltage induction motor adapted for selective operation at first and second voltage levels, a stator member comprising a core having turn-accommodating means carrying first and second winding sections formed of turns wound from electrically conductive material having a preselected resistivity; third and fourth winding sections carried by said turn-accommodating means and formed of turns wound from other electrically conductive material having a resistivity differing from said preselected resistivity; all of said winding sections being selectively connectable in series circuit relation with one another to form a plurality of running poles for operating the motor at the first voltage level; and said first and third winding sections being selectively connectable in parallel circuit relation with said second and fourth winding sections to form a plurality of running poles for operating the motor at the second voltage level, whereby the motor operation at the first and second voltage levels is approximately equivalent.

5. The stator of claim 4 in which a given running pole under the first and second voltage levels of operation includes turns wound from both said electrically conductive material having the preselected resistivity, and turns wound from said other electrically conductive material.

6. The stator of claim 4 in which at least one running pole includes turns of said first and third winding sections and at least one other running pole includes turns of said second and fourth winding sections.

7. The stator of claim 4 in which a first circuit-interrupting means is connected in circuit serially between said first and third winding sections and primarily responsive to the temperature condition thereof; and a second circuit-interrupting means is connected in circuit serially between said second and fourth winding sections and primarily responsive to the temperature condition thereof; whereby for motor operation at the first voltage level, either of said devices is independently operative to completely interrupt the flow of alternating current to the four winding sections for termination of motor operation, and for motor operation at the second voltage level, both of the circuit-interrupting means must be actuated to effect interruption of the flow of alternating current to the four winding sections for termination of motor operation.

References Cited

UNITED STATES PATENTS

| | | | |
|---|---|---|---|
| 2,860,296 | 11/1958 | Mollenberg | 318—221 |
| 3,316,471 | 4/1967 | Holdgreve | 318—225 |
| 3,322,983 | 5/1967 | Ross | 310—68 |
| 3,324,371 | 6/1967 | Stauffer | 318—225 |

ORIS L. RADER, Primary Examiner

T. LANGER, Assistant Examiner

U.S. Cl. X.R.

310—184